United States Patent [19]

Clark et al.

[11] Patent Number: 5,666,530
[45] Date of Patent: Sep. 9, 1997

[54] SYSTEM FOR AUTOMATIC SYNCHRONIZATION OF COMMON FILE BETWEEN PORTABLE COMPUTER AND HOST COMPUTER VIA COMMUNICATION CHANNEL SELECTED FROM A PLURALITY OF USABLE CHANNELS THERE BETWEEN

[75] Inventors: Ted H. Clark, Houston; Steven C. Malisewski, Cypress; Patrick R. Cooper, Houston; William Caldwell Crosswy, Spring; Larry J. Crochet, Houston, all of Tex.

[73] Assignee: Compaq Computer Corporation, Houston, Tex.

[21] Appl. No.: 984,464

[22] Filed: Dec. 2, 1992

[51] Int. Cl.[6] .............................. G06F 13/00; G06F 15/17
[52] U.S. Cl. .............. 395/617; 395/182.18; 395/200.57; 395/825; 364/962; 364/231.2
[58] Field of Search .................................. 364/200, 900, 364/962; 395/200, 275, 600, 182, 825, 617

[56] References Cited

U.S. PATENT DOCUMENTS

| | | | |
|---|---|---|---|
| 4,628,152 | 12/1986 | Akerberg | 379/51 |
| 4,807,182 | 2/1989 | Queen | 364/900 |
| 4,857,713 | 8/1989 | Chang et al. | 235/375 |
| 4,897,781 | 1/1990 | Chang et al. | 364/200 |
| 4,972,457 | 11/1990 | O'Sullivan | 379/59 |
| 4,991,197 | 2/1991 | Morris | 379/58 |
| 5,142,619 | 8/1992 | Webster, III | 395/157 |
| 5,278,979 | 1/1994 | Foster et al. | 395/600 |
| 5,301,346 | 4/1994 | Notarianni et al. | 395/800 |
| 5,327,555 | 7/1994 | Anderson | 395/600 |

FOREIGN PATENT DOCUMENTS

| | | |
|---|---|---|
| 0 500 222 | 8/1992 | European Pat. Off. . |
| WO90/13213 | 11/1990 | WIPO . |
| WO91/04461 | 4/1991 | WIPO . |

OTHER PUBLICATIONS

MBS Technologies, Inc., File Runner User's Guide, Entire Manual, 1992.

Hall, Edward "Atari's Miniature Portfolio a One Pound Dynamo" *Computing Canada*, Oct. 12, 1989 2 pages.

*Primary Examiner*—Thomas C. Lee
*Assistant Examiner*—Ki S. Kim
*Attorney, Agent, or Firm*—Pravel, Hewitt, Kimball & Krieger

[57] ABSTRACT

A handheld computer which contains an LCD display having a digitizing surface to allow pen input. Internal storage takes several forms, such as a large flash ROM area, battery-backed up RAM and an optional hard disk drive. Several alternative communication paths are available, such as the previously mentioned modem, a parallel printer port, a conventional serial port, a cradle assembly connected to the host computer, and various wireless short distance techniques such as radio frequency or infrared transmission. The computer can readily communicate with other sources, particularly to a host desktop computer, to allow automated synchronization of information between the host and the handheld system. Preferably the remote synchronization is performed at several user selectable levels. When the handheld computer is in a cradle and actively connected to the host computer, automatic capture of updated data in the host computer is performed. Several synchronization techniques are utilized to keep track of different types of files. In addition, while communication is established the handheld computer can enter a remote control mode, allowing the user access to files and applications not included in the handheld computer.

14 Claims, 10 Drawing Sheets

SYSTEM FOR AUTOMATIC SYNCHRONIZATION OF COMMON FILE BETWEEN PORTABLE COMPUTER AND HOST COMPUTER VIA COMMUNICATION CHANNEL SELECTED FROM A PLURALITY OF USABLE CHANNELS THERE BETWEEN

BACKGROUND OF THE INVENTION

1. Field of the Invention

The invention relates to portable computers, and more specifically to handheld computer systems capable of sharing data with desktop and network computer systems.

2. Description of the Related Art

Personal computers are becoming smaller and smaller. Originally personal computers were large items best suited for floor standing or desktop use. Eventually they became smaller so that desktop use became the standard. As time progressed, the units became smaller so that they became transportable in packages now referred to as "luggables". Time proceeded and computer systems became smaller, approaching laptop and, ultimately, notebook sizes. As the portability of the personal computers increased, so did the desire to use them remotely. However, in most cases notebook computers were effectively just small versions of full function desktop computers and so were relatively expensive. Further, they were also relatively heavy. This limited their usefulness as they were quite complex, relatively large and relatively expensive.

Noticing this problem, certain palmtop or handheld units were developed. Often these units were very limited function, i.e. personal organizers and the like. One relatively common drawback was that these units were not compatible with the programs operated on the larger desktop and notebook computers but had proprietary operating systems and programs. This greatly limited their usefulness in that they were effectively stand-alone devices and could not readily transfer data with other stations. Some units were also developed which did include certain common functionality, but they were generally keyboard based and the use of very tiny keyboards made them relatively unpopular. Additionally, they had only minimal features and file transfer was relatively difficult.

One trend which developed after notebook computers had been around for a period of time was a variation referred to as notepad or touchpad computers. These computers were essentially notebook computers with the keyboard removed and a digitizer applied to the display so that a pen or other pointing device could be utilized as an input device. This freed up one aspect of the computer design, mainly the requirement for a keyboard of certain given dimensions. But tradeoffs occurred. One was the relative complexity of handwriting analysis and capture and the slow speed for data entry. Therefore these units could not readily replace conventional notebook computers in many applications but were well suited and adapted for certain environments. Often these environments utilized specialized hardware or operating programs, such as for inventory control and so on, where simple check-offs could be utilized or just limited input functions were required. This limited their usage again to the particular application, so that widespread use did not develop. Additionally, most of the original notepad units were based directly on notebook computers and as such were the sizes of notebook computers, that is approximately 8 ½×11 inches and one inch thick, weighing 5 to 6 pounds. This was a drawback in that the units were then quite heavy, too heavy to carry for extended periods and were not readily convenient. By the use of particular driver software, it was possible to utilize many of the common personal computer programs, but performance was dramatically reduced because of the complexity of the operating interface and the necessary translations.

Further, as computers reached notebook and notepad sizes, it became common for a user to own two computers, one a desktop system to be used as a main system, often attached to a local area network, and a notebook computer for traveling. This resulted in the capability to use the standard desktop programs, but also some portability was present. A major problem developed in synchronization of the data between the two computers. For instance, certain data such as calendar information and so on would generally be kept on the desktop computer but it would be convenient and desirable to transfer this information to the notebook computer for travelling purposes. However, if the person was travelling and information was entered on the desktop computer or network file server while the user was gone, or if the user entered information on the local version of the data files in the notepad, then the information contained in the desktop computer and in the notebook computer were out of synchronization and major problems could develop. Therefore this synchronization problem also limited applications and the use of two computers, one a desktop and one a notebook, by individuals because the problem was difficult to resolve. Further, if resolutions were possible, they were generally very time consuming and tedious and therefore reduced the effectiveness of the systems or they required relatively detailed system knowledge by the user. One solution was to have the file that physically resided with the user be the master, but then no changes could be made to the other system without danger of being lost. So while dual computer environments existed and were used, they did not become widespread.

Therefore it would be desirable to have a small handheld computer system capable of operating certain personal information management type software such as calendars, telephone directories, and scheduling, as well as simplified versions of applications software, and sharing files with a desktop computer, with all of the files utilized by all of the programs being automatically synchronized by the two computer systems at various times to alleviate the synchronization difficulties.

SUMMARY OF THE PRESENT INVENTION

The present invention relates to a small handheld computer which includes certain core applications and allows the addition of other user selected applications. The computer contains a video display, preferably an LCD, having a digitizing surface to allow pen input, so that the display and pen operate as the user interface. The core applications are preferably optimized for this interface and the user selected applications may have pen input modes. A keyboard is optional to provide more conventional textual input. Internal storage takes several forms, such as a large flash ROM area, battery-backed up RAM and an optional hard disk drive.

A combined fax/modem unit is included so that the computer can readily communicate with other sources over various telephone networks, particularly to a host desktop computer to allow automated synchronization of information between the host and the local handheld system. Preferably the synchronization is performed at several user selectable levels, such as whenever the computer is first turned on or at certain periodic intervals if a communications path to the host computer is available or can be made available. To this end several alternative communication paths are available, such as the previously mentioned modem, a parallel printer port, a conventional serial port, a cradle assembly connected to the host computer, and various wireless short distance techniques such as radio frequency or infrared transmission.

When the handheld computer is in the cradle and actively connected to the host computer, the handheld computer enters a mode where it automatically captures updated data in the host computer which is also contained in the handheld computer. In this manner, while the two are physically connected automatic synchronization of the data is performed in real time. When the handheld computer is removed, then the aforementioned synchronization alternatives are developed. Additionally, synchronization can be performed on user command.

Several synchronization techniques are utilized to keep track of different types of files. For example, a phone number database and calendar file synchronization routine operates to determine if new entries are present and if so, scans the new entries for conflicts. Any conflicts are presented to the user for selection of the desired appointment or phone number prior to permanent entry. If new, nonconflicting data is being provided from the host system, it is preferably automatically entered or can be added after approval by the user. Information newly entered into the handheld computer is preferably automatically updated to the host computer as it is assumed that the user is the master of the information. This sort of tracking is done for each and every entry in the particular calendar and phone number files until complete.

Expense account program files are synchronized in a different fashion. When the handheld computer is in communication with the host computer, any time a new file or updated file is present in the handheld computer, it is automatically relayed back to the host computer to allow more permanent storage.

If numerous files or entire directories are to be synchronized, then when communication is established, the file lists are scanned to determine if any of the files have been changed. If so, a file viewer can be activated and the differences shown, with the original and the new files shown in a side-by-side manner. This readily allows the user to select whether the handheld computer file or the host computer file or in fact both are to be saved and added to the appropriate systems. In cases where the file viewer cannot use the specific format, a conversion utility can be used to convert to a viewable format or the file may be shown as a graphic image.

In addition, while communication is established the handheld computer can enter a remote control mode, allowing the user access to files and applications not included in the handheld computer.

Thus, synchronization is automatically performed between the handheld system and the host computer to allow the user to have the most updated data, so that problems such as multiple appointments, interfering telephone numbers, or multiple drafts of documents are not developed.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1A:
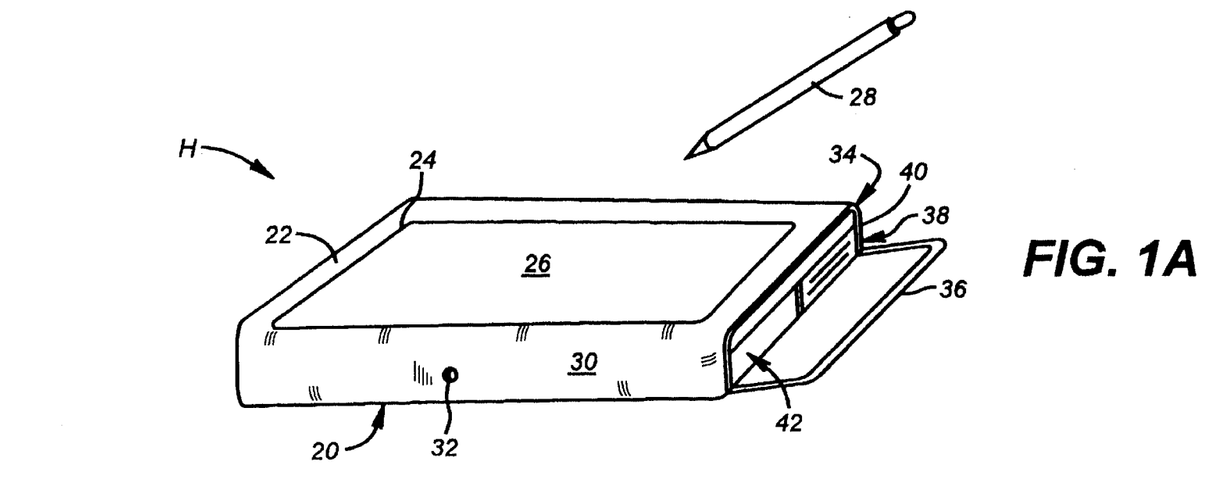
FIGS. 1A and 1B are perspective views of a handheld computer according to the present invention.
Figure 1B:
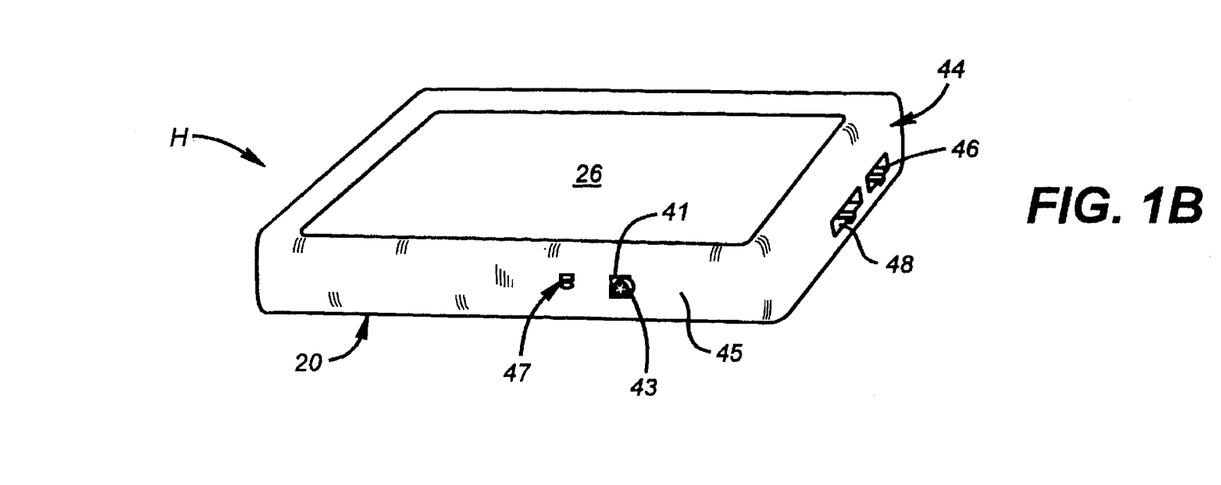

Referring now to FIGS. 1A and 1B, two alternate views of a handheld computer, generally referred to by the letter H, according to the present invention are shown. The handheld computer H includes an outer housing 20 in which the components are contained. The top 22 of the housing 20 preferably contains a rectangular opening 24 to allow visibility of an LCD panel display 26 or other suitable video display which also contains a digitizer 110 (FIG. 4) and a backlight 112. A pen 28 is used to interface with the digitizer 110 and the display 26 to provide input. Preferably on the left side 30 of the housing 20 a hole 32 is present to allow the insertion of an AC adapter or DC power source providing battery charging energy to the computer H. At the bottom end 34 of the housing 20 is a hinged door 36 which when pivoted down provides access to a cage 38 containing slots for receiving two PCMCIA cards 40 and for providing access to a battery cartridge 42 in which rechargeable batteries such as Ni-Cads or NiMHs or conventional alkaline batteries are located. Preferably 4 AA size batteries are utilized, though a camcorder or other standard, small battery could be utilized with a slight component rearrangement as necessary. Alternatively, the door 36 could be slidably engaged with the bottom end 34. The PCMCIA cards are readily interchangeable with the door open 36 and the battery cartridge 42 is readily removable to allow exchange of battery cartridges 42 if desired.

In FIG. 1B it is shown that the top 44 of the housing 20 contains two receptacles 46 and 48. Preferably receptacle 46 is an RJ-11 type receptacle for receiving a telephone connection, while the receptacle 48 is a similar spring clip type receptacle for receiving a special adapter cable as will be described below. The right side 45 of the housing 20 contains an opening 47 to allow an internal speaker 61 a port. Additionally, the right side 45 includes an opening 41 for allowing access to a keyboard port 43. Preferably the handheld computer H is approximately 4 inches wide, 6 inches tall and 1 inch thick.

Figure 1C:
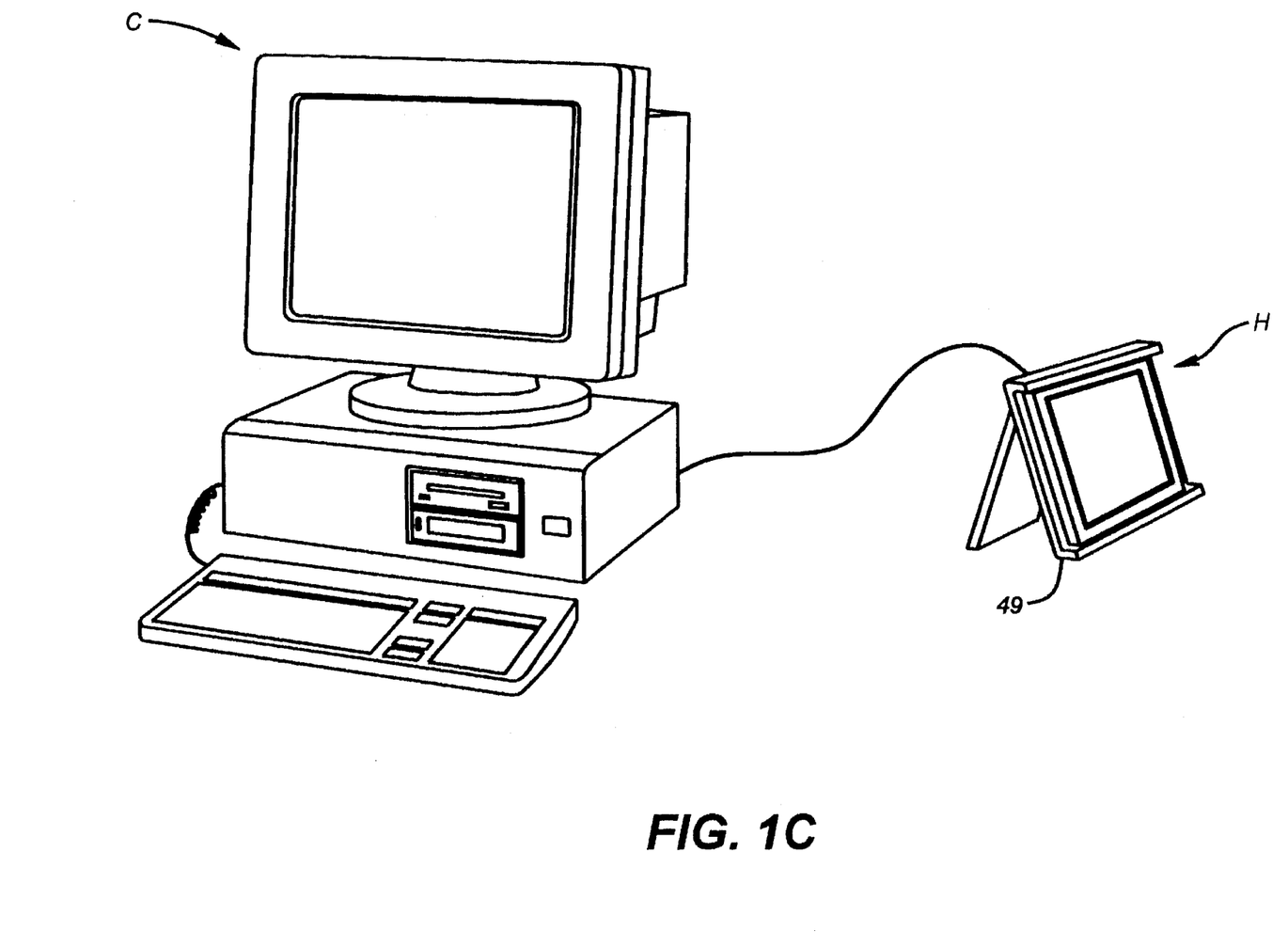
FIG. 1C is a perspective view of the handheld computer of FIGS. 1A and 1B located in a cradle and directly connected to a host computer.

In FIG. 1C the handheld computer H is shown installed in a cradle 49, which is directly connected to a host computer C. Cradle 49 connection and operation is described below.

Figure 2:
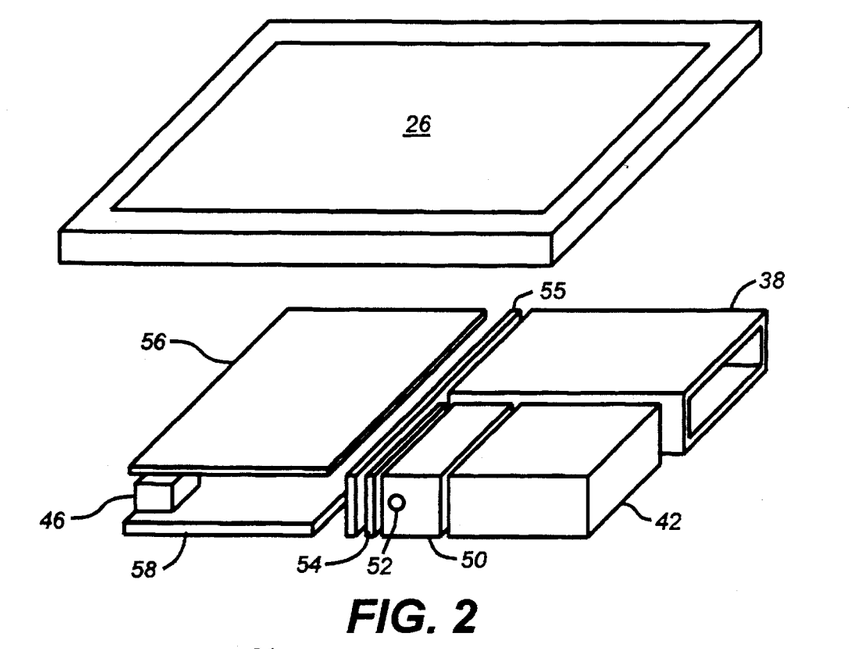
FIG. 2 is an exploded perspective view of the internal components of the handheld computer of FIGS. 1A and 1B.

Referring now to FIG. 2, the various internal components in the handheld computer H are shown. The LCD panel 26, with an accompanying backlight 112, overlays the remaining components. An antenna (not shown) for use as a radio frequency wireless communications link can be located on one edge of the LCD panel 26. The PCMCIA cage 38 is located adjacent to the battery cartridge 42 and a power supply 50, which also contains a receptacle 52 for receiving a plug from an external battery charger through hole 32. An auxiliary battery 54 is located adjacent the power supply 50 for ease of use. Preferably a stiffening rib 55 is provided adjacent the auxiliary battery 54 and the PCMCIA cage 38 to allow robustness of the housing 20 and support of the LCD panel 26. Two planar circuit boards 56 and 58 are located in a parallel arrangement at the end of the handheld computer H. Preferably one of the circuit boards 58 contains the receptacles 46 and 48, with the two circuit boards 56 and 58 containing the necessary electrical circuits for general operation of the computer H.

Figure 3:
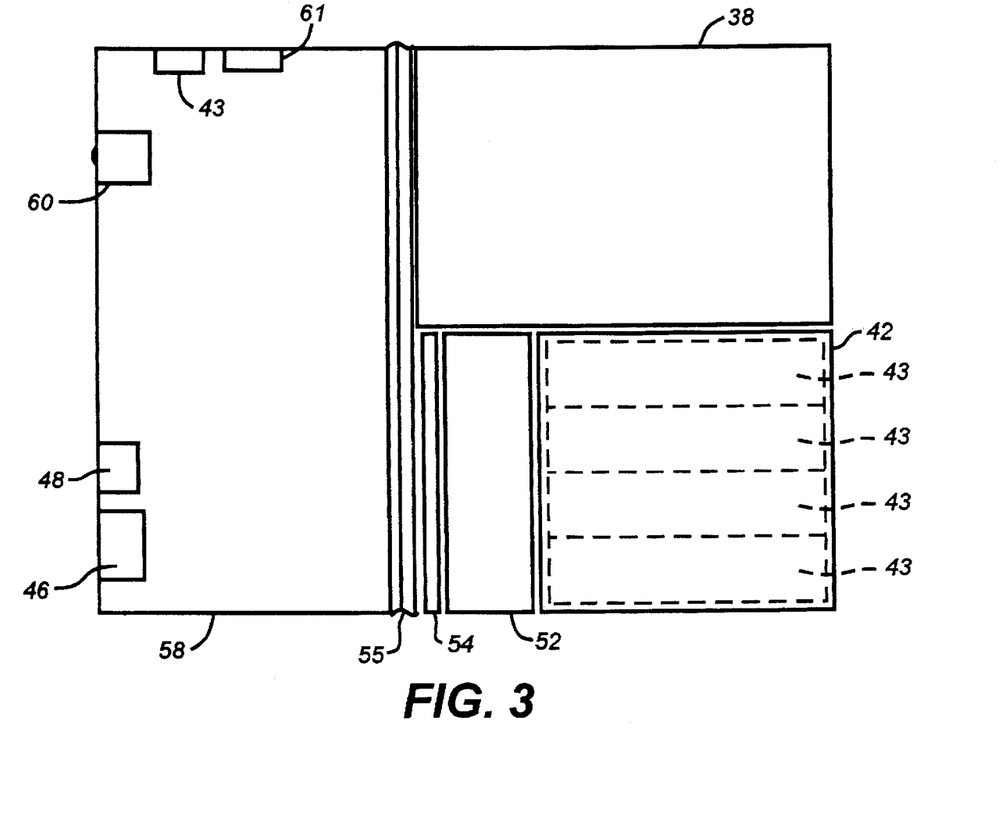
FIG. 3 is a top layout view of the components of FIG. 2 without the display.

FIG. 3 shows a top view of the relationship of the components in FIG. 2 with the LCD panel 26 removed. As noted in FIG. 3, an infrared transceiver 60 can be installed on the circuit board 58 if desired with an appropriate opening also included in the handheld computer H. Additionally, the speaker 61 and the keyboard port 43 are preferably mounted on the circuit board 58. The speaker 61 is preferably of a size and quality to allow adequate voice reproduction.

Figure 4:
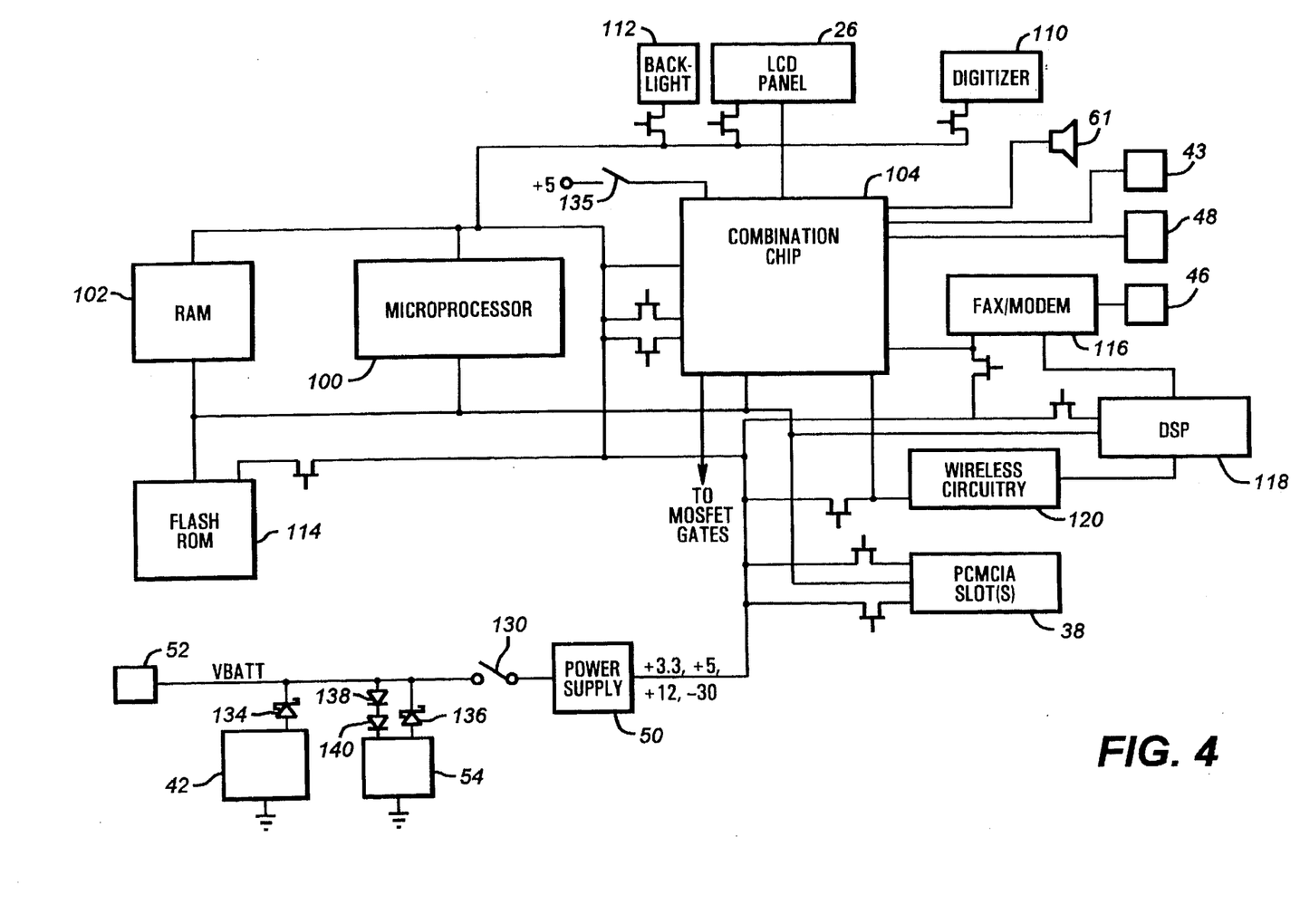
FIG. 4 is a schematic diagram of the handheld computer of FIGS. 1A and 1B.

FIG. 4 is an electrical block diagram of the handheld computer H. While a particular organization is illustrated, it is understood that other organizations, supersets, subsets and partitions of the components can be utilized. A microprocessor 100 forms the core and processing element of the computer H. Preferably the microprocessor 100 is a 3.3 volt unit for reduced power consumption. The microprocessor 100 can be a unit such as the 486SL from Intel Corporation or other equivalent units which have high performance and include special power down capabilities. Indeed, preferably all of the devices contained in the computer H are 3.3 volt versions to reduce power consumption and 5 volt logic is utilized only where lower voltage logic is not available or the alternative is not cost effective.

A combination chip 104 is connected to the microprocessor 100 and to an interface bus 106 provided from the microprocessor 100 and supplemented by the combination chip 104. Preferably the combination chip 104 includes a number of various elements necessary for operation of the computer H. For example, in the preferred embodiment, the combination chip 104 includes a complete video controller system which is used to interface with the LCD panel 26, as well as the video memory utilized with the video system. Preferably the LCD panel 26 has a resolution of 640×480 pixels. Preferably the combination chip 104 also contains a memory and refresh controller; a PCMCIA interface; a UART for conventional serial port use; a parallel port; a real time clock; various timers conventionally utilized in a personal computer system; a programmable interrupt controller, preferably one with reduced capabilities; a memory decoder to allow access to the various internal and external components; a keyboard interface; speaker driver logic and power control logic. Preferably the combination chip 104 also includes UART/parallel port/cradle port switching detection logic as will be defined below and interface circuitry to allow the use of wireless communications with the computer H, such as radio frequency or infrared links. Further, the combination chip 104 contains the digitizer logic utilized with a digitizer 110 which receives and cooperates with the pen 28. Therefore the vast majority of the specialized functions utilized in the handheld computer H are contained in the combination chip 104.

Of particular interest is the power control logic which allows quite flexible capabilities, including outputs for shutting down most of the components in the handheld computer H to allow dramatically reduced power consumption. This is desirable considering that in the preferred embodiment only 4 AA cells 43 are fitted into the battery cartridge 42 and thus the available power is limited. The power control outputs of the combination chip 104 are preferably provided to a number of n-channel enhancement MOSFET transistors which are used to actually control power to each one of the various devices in the handheld computer H, including portions of the combination chip 104 itself. Additionally, the power control circuitry preferably includes several modes for clock speed reduction to the microprocessor 100 to reduce its power consumption. As an alternative, portions of the power control circuitry can be located in the DC-DC converter 50.

Other components in the handheld computer H include the speaker 61 and the backlight 112 which is utilized with the LCD panel 26 to provide a lighting source. Preferably the backlight 112 includes an ambient light monitoring system such that if the ambient light is sufficient, the backlight 112 is turned off. The LCD panel 26 is preferably a transflective panel to allow reduced use of the backlight 112. Additionally, a hot spot or specific area or touch pad on the LCD panel 26 could be used to allow the operator to manually turn off the backlight or engage automatic operation. In certain designs the backlight 112 may be omitted completely to reduce cost, complexity and size.

Random access memory (RAM) is connected to the bus 106. A flash ROM 114 is connected to the bus 106 and is utilized to store various operating sequences of the handheld computer H and its organization will be described below.

A digital signal processor (DSP) 118 is connected to the bus 106 and to a fax/modem interface unit 116. The DSP 118 includes the necessary logic, circuitry and software to allow it to perform as a combined fax/modem unit. Preferably the fax/modem capabilities of the DSP 118 provide a 14.4 k bps modem utilizing various standards such as V.22, V.22 bis, V.32, V.32 bis, V.42 and V.42 bis and various compression schemes such as MNP5 and MNP10. Additionally, the fax capabilities are preferably Group 3 9,600 bps fax. The fax/modem interface unit 116 performs the necessary interface functions and thus acts as a DAA, with connection to the RJ11 jack 46 to allow use with an external line for connection into the telephone network. Additionally, various external units, such as foreign country DAA units, cellular telephones and packet radio transceivers could be connected to the jack 46, with the DSP 118 adapting to the connected external unit.

The PCMCIA cage 38 is also connected to the interface bus 106. In the preferred embodiment because of the physical space limitations preferably a tradeoff is made. A hard drive conforming to PCMCIA standards can be installed and a single PCMCIA Type II slot can be present or alternatively two slots can be utilized and no hard drive is present. As the various components are reduced in size, this tradeoff could be eliminated.

Wireless interface circuitry 120 is also connected to the DSP 118. The exact wireless interface circuitry 120 depends upon the particular type of interface desired. For example, if an infrared interface is desired, then the circuitry 120 is connected to an infrared transceiver 60 to allow communications with suitable external units. These external units can either be connected to an individual host computer or can be connected to a server node of a network environment. Alternatively, the wireless circuitry 120 can be adapted for radio frequency operation, preferably spread spectrum type techniques, as are known in wireless local area network units, or could conform to various cellular telephone or packet radio protocols. The DSP 118 performs the necessary conversions and protocol handling of the particular wireless communication techniques utilized to allow direct connection to the bus 106 for simple access by the microprocessor 100.

As noted above, serial/parallel/cradle port logic is present in the combination chip 104. The second jack 48 connects to this logic. To save space preferably the serial port functions, the parallel port functions and a cradle interface 49, which allows connection to a host computer C, are preferably provided via the single connector 48. Identification of the particular function is done by the use of a special cable which is used to connect the jack 48 to the particular device. For example, a cable can plug into the jack 48 and ground two pins to indicate a serial function, with the second end of that cable being connected to a conventional DB9 or DB25 serial connector. Upon detection of the particular mode, the combination chip 104 enables the particular buffers and drivers to allow an internal UART to connect to the jack 48, to allow a conventional serial interface to be developed in the handheld computer H. Alternatively, a different plug is installed into the jack 48 for parallel port operation so that, for example, one of the encoding pins is grounded and the other is left high. This indicates a parallel port selection so that the remaining pins could be utilized to function as an enhanced capabilities port or as a conventional bidirectional Centronics parallel interface as commonly used as personal computers. In the third alternative the cradle assembly 49 is utilized to receive the handheld computer H. Sliding the computer H into the cradle 49 automatically interfaces it with a plug which mates with the jack 48. In this case a third alternative is developed which is similar to the parallel port in many circumstances, in that 8 bit bi-directional information is passed at high speed, but this configuration also activates certain software inside the handheld computer H and the host computer C as will be described below. Preferably the connection is configured to allow the parallel port of the host computer to be connected as the cradle port and at the same time also allow conventional parallel printing capability by the host computer to a parallel printer. Additionally, the cradle 49 can be used to charge the main batteries 42.

The speaker driver logic can be used to provide audio annotations to events. The speaker driver logic is preferably of sufficient sampling rate and sample length to allow telephone quality voice reproduction, but higher quality could be developed if desired. If voice input is desired the speaker 61 is also used as a microphone. Alternatively, the speaker driver logic can receive voice mail files from a voice mail system over a communications link and allow remote playback of the messages.

The keyboard port 43 is connected to the keyboard interface in the combination chip 104 and is provided to allow use of an external keyboard, if desired. The keyboard port 43 preferably is a mini-DIN or PS/2 style jack, but an infrared transceiver could be used if desired. Alternatively, a small keypad could be provided on the housing 20 and connected to the keyboard interface to replace the digitizer 110 in certain limited function, cost and space critical applications. This small keypad could be used in combination with the speaker driver logic to allow voice commands to be utilized to save keyboard space and typing time.

Preferably the power down capabilities in the combination chip 104 are very flexible. For example, a number of timers are utilized for various system activities, based either on multiple operations or on individual units. For example, the hard drive 118 is preferably powered down when use of the hard drive 118 has not been requested within a given period of time or if the computer H enters a mode referred to as STANDBY1, where none of the functions of the computer H have been requested for a given time. Preferably separate power is provided to each of the PCMCIA slots in the cage 38 with this power being configurable. Preferably four configured states are included, such that the slot is always turned on, always turned off, or is powered off based on entering STANDBY1 or STANDBY2 states. In STANDBY1 state, the computer H is basically waiting to receive an input from the pen 28 to indicate it is suppose to awaken. Thus in this manner the system could effectively power down between operations. Alternatively, a wireless connection could be developed to allow data transfer as the computer H is just casually being carried, without the computer H being fully turned on. This would allow removal from STANDBY1 into a full active effect. As a further alternative, the real time clock could be set with an alarm function to cause exiting of STANDBY1 to full activity. In STANDBY2 the computer H is as completely powered down as possible, with the microprocessor 100 being at zero speed and only the RAM 102 and a small portion of the combination chip 104 receiving power. In this mode a standby button 135 is utilized to awaken the computer H and to bring it back into operation.

The fax/modem 116 is also preferably configurable, to be on, off or interactive based on a timer, or on activity such as ring indication or carrier detect. On entry into the STANDBY1 state the fax/modem 116 is also powered down. Preferably the wireless circuitry 120 is either powered off, if the option is not present, or is powered down in a STANDBY2 state. The backlight 112 is preferably either turned off by a sufficient level of the ambient light as indicated above, by a display off timer, or by entry into the STANDBY1 state. Similarly, the LCD display 26 and the video controller contained in the combination chip 104 are deactivated and powered down by the display off timer or in the STANDBY1 state. The video memory and any video configuration registers remain powered at all times so that display data is not lost. The digitizer 110 is preferably powered down only in the STANDBY2 state, as the digitizer circuitry 110 and any related circuitry in the combination chip 104 are necessary to allow acknowledgement of a pen 28 touch to bring the computer H out of STANDBY1 and into operation. Also, the digitizer circuitry in the combination chip 104 enters a decreased resolution mode in STANDBY1 state as only gross touching of the LCD panel 26 need be monitored for waking up. The combination chip 104 also powers down any of its appropriate portions relating to external circuitry which is powered down. For example, the hard drive interface 118 is powered down when the hard drive 118 is powered down, or the PCMCIA slot interface is powered down when all of the PCMCIA slots are powered down.

The microprocessor 100 is preferably slowed down to a very low clock rate in STANDBY1 as its only required functions are monitoring for inputs from the wireless circuitry 120 or the digitizer 110 and to a zero frequency at STANDBY2 level to dramatically reduce power consumption. Alternatively, in a STANDBY2 state the system management mode, such as in the 486SL, could be invoked, so that the various system registers could be provided into the RAM 102 and then the microprocessor 100 actually powered down. The ROM 114 is preferably powered off in a STANDBY2 state, while the RAM 102 is constantly powered with self-refresh operations occurring when refresh information is not received from the microprocessor 100. Overriding all of this is the manual on/off switch 130 utilized in the power supply circuitry 50 to allow the operator to completely turn on or turn off the computer H. However, the on/off switch 130 is preferably relatively inaccessible as the more rapid recovery from STANDBY1 or STANDBY2 is preferred over the long initial POST and boot periods which occur at power on.

While certain devices are described as being powered down in STANDBY1 or STANDBY2 states, the described states can be considered to be default or preferred cases, with the actual STANDBY1 and STANDBY2 device power down status being user configurable if more flexibility is desired.

As noted, the handheld computer H contains two types of batteries. The battery cartridge 42 preferably contains four AA cells 43 which form the main battery. Preferably different cartridges 42 are used for rechargeable and alkaline batteries. The rechargeable battery cartridge is directly connected to the VBATT line present at jack 32 to allow charging and discharging of the main batteries. If an alkaline battery cartridge 42 is utilized, this direct connection is not present but a Schottky diode 134 is included so that the batteries can not be charged but can discharge. Alternatively, as noted above, other readily available batteries could be used, such as camcorder batteries. The VBATT line connects the battery charger jack 32 to the power switch 130. The auxiliary battery 54 is connected to ground, and to the VBATT line through a Schottky diode 136 line to allow the auxiliary battery 54 to provide power when the main battery 42 is removed and through a series pair of diodes 138 and 140 which provide a voltage drop for charging the auxiliary battery 54, which is preferably a 1.5 volt battery, in deference to the battery cartridge 42 being configured as a 3 volt supply, so that the auxiliary battery 54 is charged only when the battery charger is present and does not consume power when only the battery cartridge 42 is present. The power supply switch 130 is connected between the VBATT line and a DC-DC converter or power supply 50. Preferably the DC-DC converter 50 provides the necessary voltages needed for the handheld computer H, such as +3.3, +5, +12 and −30 volts. While the various diodes 134, 136, 138 and 140 are set out as external to the DC-DC converter 50, they could be included or alternative circuit arrangements in the DC-DC converter 50 could be used to control switching between batteries and controlling charging and discharging.

Figure 5:
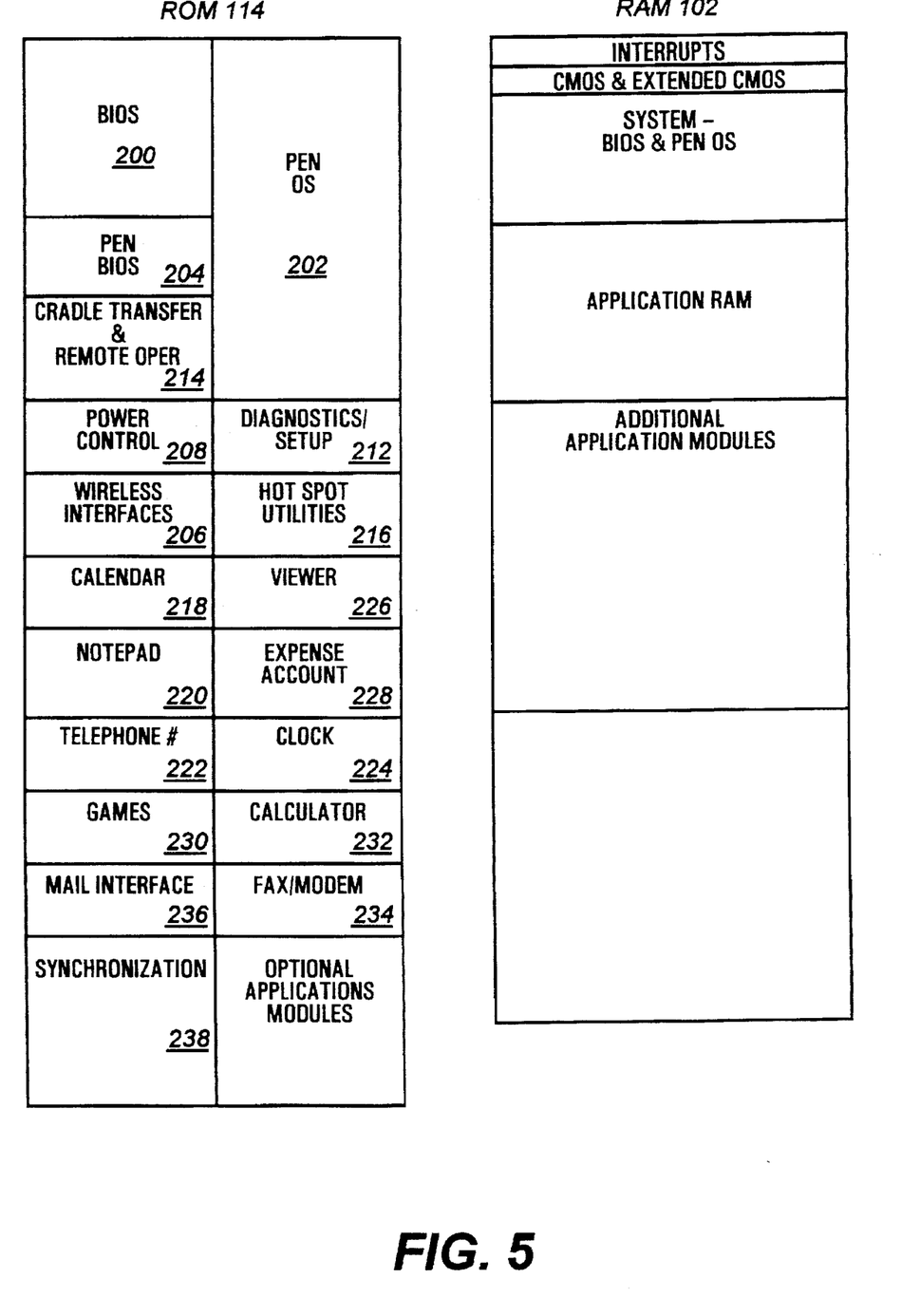
FIG. 5 is a diagram illustrating the various programs and other data stored in the read only memory and random access memory present in the handheld computer system of FIGS. 1A and 1B.

Referring now to FIG. 5, a number of software modules are stored in the flash ROM 114. Preferably certain core modules are always present and additional application software can be added at the user's request. Preferably the ROM 114 is from 4 to 8 Mbytes in size to allow storage of a large amount of information. For example, the ROM 114 always contains BIOS or basic input/output operating system software 200 which serves the same function as the BIOS of a personal computer and provides the various linkages and basic software services in the handheld computer H. Preferably the pen operating system 202 utilized with the pen interface is also present in the ROM 114 to allow fast response time. To interface with the pen operating system 202, certain pen BIOS routines 204 are utilized. Preferably wireless operation module 206, power control routines 208, and diagnostics and setup utilities 212 are also included in the ROM 114, though the wireless module 206 could be omitted if wireless operation is not available.

The setup utilities 212 include programs to allow the user to select various operating modes and select options in the computer H, a number of which options are described below. Further, the setup utilities 212 can include an interface program which allows the user to select certain other applications programs to be stored in the ROM 114. Cradle transfer and remote operation software 214 is present so that the host computer can transfer information for permanent storage in the ROM 114 as needed for setup and is used for synchronization as described below. The setup utilities 212 communicate with the cradle transfer software 214 and the host computer to have the desired information down loaded and then activate the flash capabilities of the ROM 114 for storage. A module 216 to allow certain hot spots or designated areas on the display 26 to be utilized for commands is also included.

As noted above, certain personal information management applications are also preferably present in the handheld computer H. It is understood that versions of these applications are also present on the host computer. One of these applications is a calendar module 218 to allow the user to make appointments, a notepad 220 to allow the user to jot down miscellaneous notes as required, a phone number or contact directory 228, and an expanded clock 224. Preferably the clock 224 allows worldwide operations, with both a local time and a base time. The base time is desirable to match that of the host computer to simplify synchronization operations. Alternatively, Greenwich Mean Time could be maintained as a base time. Preferably the base time is not easily changed but can only be done when the handheld computer H is in communication with the host computer to reduce loss of synchronization reference possibilities. Of course, base time would be settable if the stored CMOS values are corrupted. Preferably file or data storage done in the handheld computer H is based on the base clock time, not the local clock time, to allow ready comparison with the host computer. A file viewer 226 is provided to allow viewing of files of particular types of common applications, such as word processor, spreadsheet and data base files. Preferably the number of file types supported is relatively limited, to reduce the size of the viewer 226, but preferably interchangeable elements are included to allow the user to customize the viewer supported file list to those frequently used. Preferably the viewer 226 also contains conversion software to convert unsupported file types to supported file types and graphic image presentation software if a conversion type is not available.

As the computer H is going to be used during travel, it is considered appropriate to include expense account software 228 resident in the ROM 114 so that as charges are incurred, the user can readily enter them into the handheld computer H so that they can be transferred back to the host computer and a log of expenses developed both locally and remotely. Certain games 230 can be present, in addition to a calculator 232. Further, the fax/modem interface software 234 is present to allow data transfer or communications capabilities. The ROM 114 also preferably contains interface modules 236 to allow access to common, dial-up E-mail systems such as MCI Mail or AT&T EASYLINK or for entry into various local area network, shared mailed systems such as MicroSoft Mail, cc:MAIL and the like.

One further module contained in the ROM 114 is a synchronization module 238. This program will be described in more detail below but basically provides the capability to automatically synchronize the various files used in the computer H, such as the calendar 218, the phone directory 222 and the notepad 220 and any application software programs or miscellaneous files and directories which may be designated by the user with copies of the same files maintained in the host computer. The remaining areas of the ROM 114 can be utilized to store applications software. Preferably the applications software is configured for use in the handheld computer H and as such will contain certain reduced or simplified, less functional versions of the full desktop or network version for reduced storage requirements. In this manner, while certain functions are not available, certain functions generally utilized on the road, such as minimal data entry recalculation of spreadsheets, simple editing of word processing without extensive macro capabilities, and so on can be provided directly from the ROM 114 without having to use the RAM 102.

The RAM 102, preferably 4 to 8 Mbytes, contains the necessary random access memory for the host computer H, such as that needed for the interrupts and the basic operating system RAM area. Further, it may be desirable for the user in a particular case to include the additional functionality removed from application software contained in the ROM 114 so that full capabilities are provided. If so, the additional software is loaded into the RAM 102 with the particular application software understanding that the complete functions are now available. Additionally, the RAM 102 serves the function of the prior CMOS in personal computers so that CMOS configuration values, the various user configurable options and extended configuration information, such as which particular files and directory structures are to be considered as present or need to be synchronized, is stored in the RAM 102. Preferably a copy of this information could also be stored in a special file on the host computer and possibly in the flash ROM 114, to allow easy recovery. For instance, the extended configuration information could contain a data structure such as an INI file as commonly found in Microsoft Windows, which then contains a listing of all the files and/or directories which are to be considered necessary for synchronization and are present in both the handheld computer H and on the host computer.

Alternatively, a GRP or group file as utilized in Microsoft Windows can be used to indicate the files and directories to be stored and synchronized. The user first develops a SYNCHRONIZE group. Then files, directories and dedicated programs are assigned icons. These icons are placed in the SYNCHRONIZE group. Windows automatically alters the GRP file. The change in this special group is then transferred to the handheld computer H as described below. The new file or information is transferred to the handheld computer H and added to the synchronization list. Similarly, an icon can be removed and the related file or program is removed from handheld computer H and is no longer synchronized automatically. This allows simple selection and deselection from storage and synchronization.

As yet another alternative, the changing of files and other information which are contained in the handheld computer H and are synchronized could be automated based on certain activities. For example, entries in the calendar could include a list of files or applications necessary for a particular meeting. At a predetermined time before the event the calendar program would activate a module which establishes communication if not already established, gathers the listed files from the host computer, copies them to the handheld computer H and sets them up for synchronization. In this manner the user would automatically have the necessary files for the meeting. After the meeting is over, the calendar program synchronizes the files as described below and then removes them from the synchronization list and the handheld computer H, thus conserving space automatically and yet still allowing any changes to be saved.

Certain portions of the RAM 102 are set aside for use by the various modules and application programs in the ROM 114. The remaining areas of the RAM 102 can be used to install additional application software which is not desired to be more permanently stored in the flash ROM 114 or which may not be able to be installed in the ROM 114.

Figure 6:
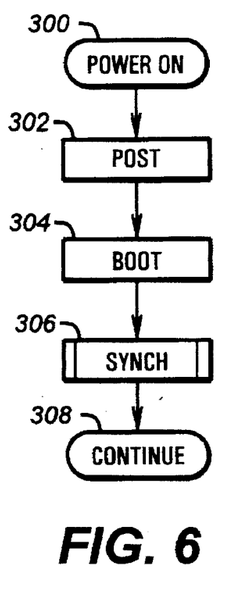
FIGS. 6, 7, 8, 9A, 9B, 10, 11 and 12 are flowchart illustrations of operating procedures of the handheld computer of FIGS. 1A and 1B, particularly related to synchronization of data.

Referring now to FIG. 6, the power-on sequencing of the handheld computer H is shown. The power-on sequence 300 begins by performing conventional power-on self-test (POST) operations in step 302. Control then proceeds to step 304, where the handheld computer H boots. In the particular case of the handheld computer H this is a relatively fast operation as the operating system is preferably contained in ROM 114 as the PEN OS module 202. Control then proceeds in step 306 to a synchronization sequence 450 (FIG. 10) which is described below. After synchronization is performed at power-on, control proceeds to the remaining functions necessary for operation in step 308.

Figure 7:
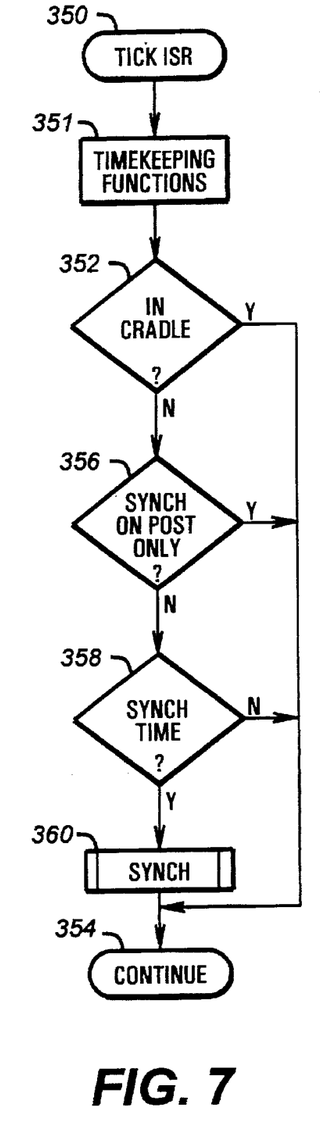

It is also understood, as shown in FIG. 7, that in most instances computer H will have a conventional tick counter to allow real time operations. This counter is based on an interrupt from a timer that is contained in combination chip 104. The tick counter develops an interrupt which then invokes a tick interrupt service routine (ISR) 350. In certain cases the operating system may have a regularly scheduled event or program used for real time clock purposes, with this program then being equivalent to the tick ISR 350. The tick ISR 350 commences at step 351 where the timekeeping functions are performed. Control proceeds to step 352 to determine if the handheld computer H is located in a cradle. If so, control proceeds to step 354. If not, control proceeds to step 356 to determine if synchronization is to be done automatically only in the power on sequence 300. Synchronization can always be done on a specific command from the user. If only in the power on sequence 300, control proceeds to step 354. If not, control proceeds to step 358 to determine if a given elapsed time has occurred since the last attempt to synchronize. It is desirable that the user be able to designate a time at which the handheld computer H will automatically try and synchronize the various files. This dramatically increases the automatic operation and reduces the possibilities of data differences existing between the host computer and the handheld computer H so that the user will not miss important appointments and so on. If it is not synchronization time, control proceeds to step 354. If it is time for synchronization, control proceeds to the synchronization sequence 450 in step 360. After synchronization is complete, control proceeds to step 354, where the other various operations of the tick counter are performed.

Figure 8:
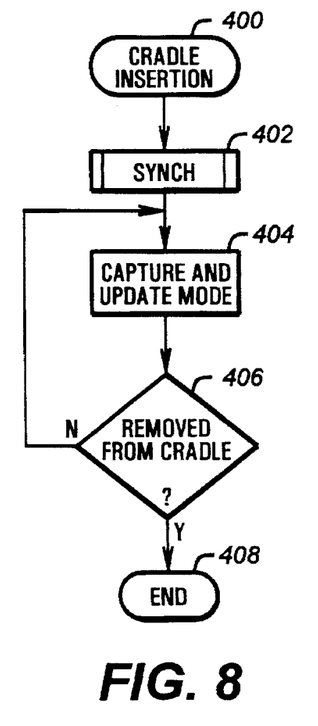

As noted in step 352, a determination is made whether the computer H is located in a cradle. If so, it is assumed that certain capture and update software is operating on both the host computer and on the handheld computer H so that synchronization occurs as a particular file in the synchronization list or group is updated or so that file transfer occurs synchronization grouping or selection is changed, as described above. To this end the software must be activated and it must be determined when the unit is inserted. By monitoring the jack 48, an interrupt is generated to cause operation of a cradle insertion sequence 400. Preferably the on/off switch 130 is not accessible while the computer H is in the cradle so that the computer H cannot be inserted in the cradle while powered off, causing no interrupt to be generated, and then be turned on later. The cradle insertion sequence 400 commences at step 402 where the synchronization sequence 450 is called so that the files are automatically initially synchronized. After synchronization has been completed, control proceeds to step 404 where the cradle transfer and remote operation module 214 is executed. The module 214 puts the handheld computer H in capture and update mode so that as entries are made on the host computer, with a compatible corresponding program running on the host computer, any data which is contained in the handheld computer H is automatically updated as it is updated on the host computer or files and synchronization information which are changed are automatically transferred or changed. In this manner synchronization is automatically and continually performed while the handheld computer H is in the cradle. In step 406 a determination is made if the computer H has been removed from the cradle. If not control remains at step 404. If so, capture and update mode is ended at step 408.

Figure 9A:
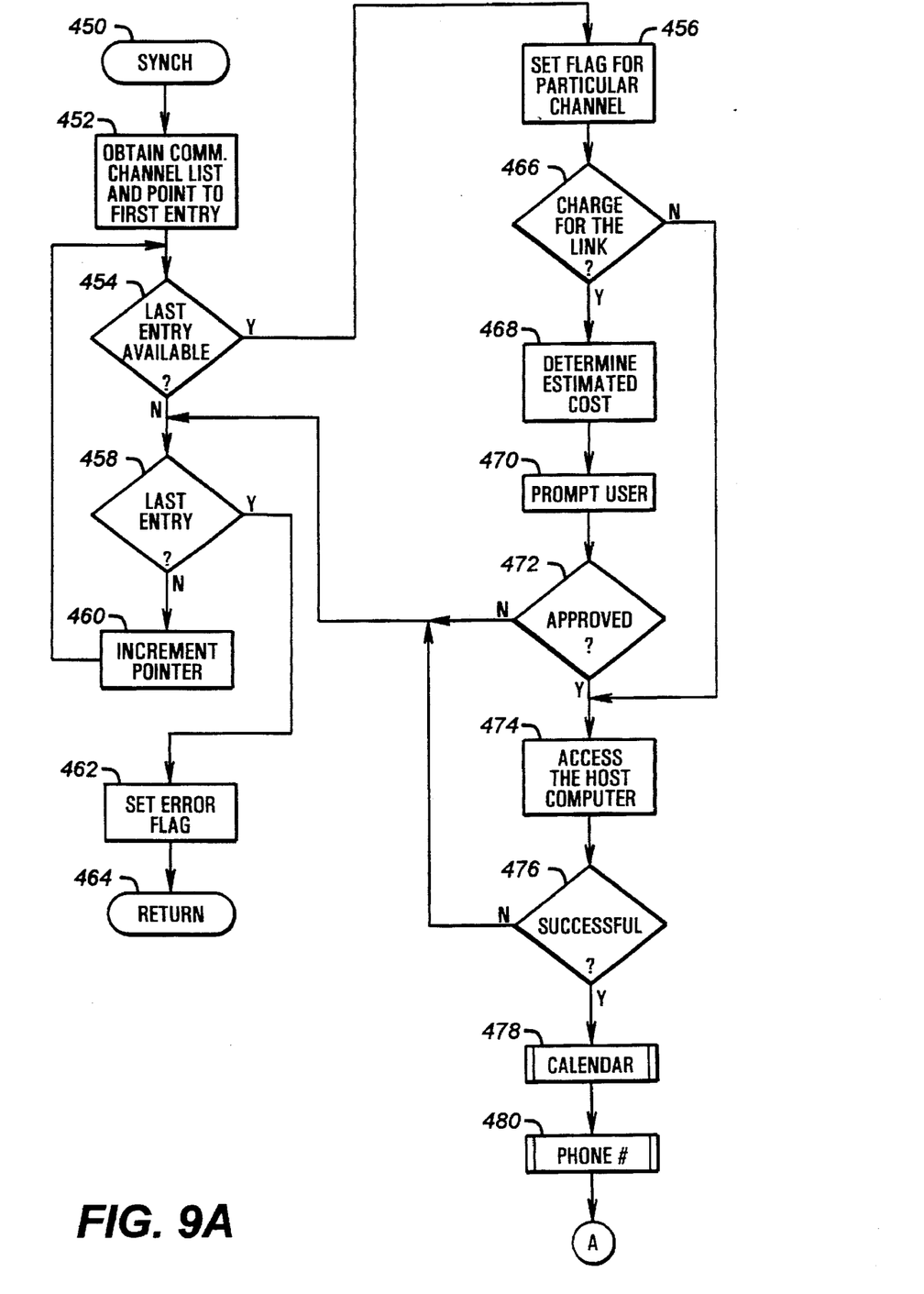
Figure 9B:
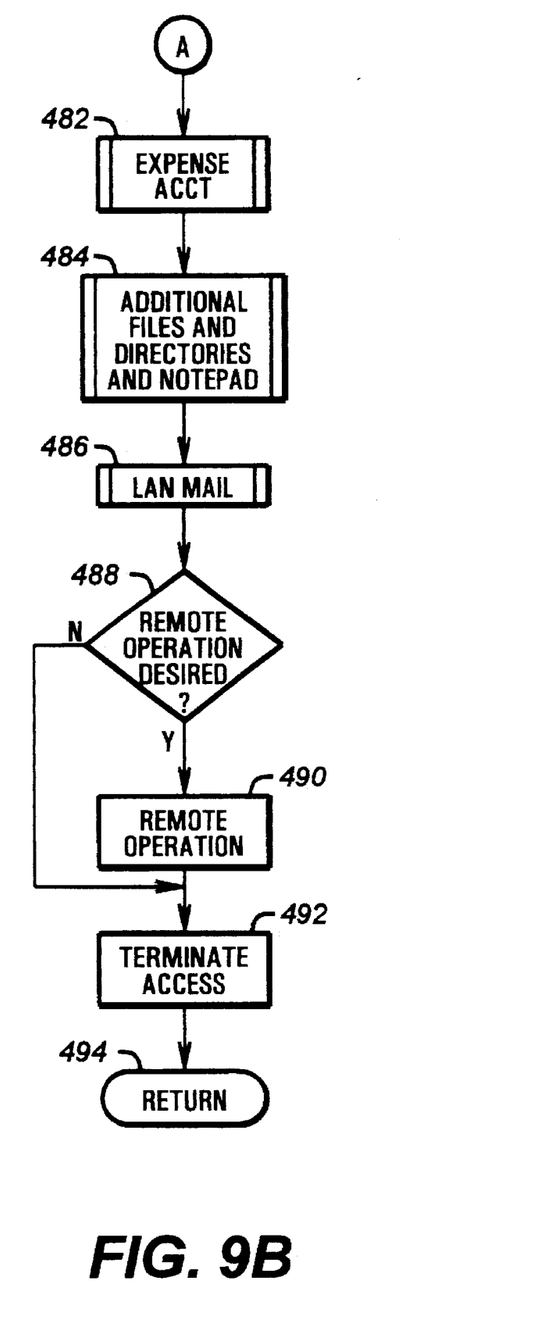

Referring to FIGS. 9A and 9B, the synchronization sequence 450 is illustrated. The sequence 450 commences at step 452 where the computer H obtains a communications channel list and a pointer is set to the first entry. The communications channel list is user settable to indicate the order in which the possible use of the various communications channels will be scanned. Preferably this order is from least to most expensive, but the order may be varied. Additionally, if an external unit such as a cellular phone or packet radio is connected to the serial port or a long distance connection would be established, the order may be varied. The preferred order is parallel port/cradle, wireless interface 120 if available, serial port, and modem 116.

In step 454 a determination is made whether the pointer referenced channel is available. If so, control proceeds to step 456. If not, control proceeds to step 458 to determine if the last entry was just checked. If not, at step 460 the pointer is incremented to the next entry and control returns to step 454. If the last entry was not available, indicating no available channels, control proceeds to step 462 where an error flag is set and to step 464 where control returns to the calling program.

In step 456 a flag is set to indicate the particular channel to be used. Control proceeds to step 466, which is a determination whether the particular data link or channel to be established has a charge. For example, the modem link could be assumed to be attached to a long distance line or an external option could include a packet radio or cellular phone interface. In these cases it is appropriate to prompt the user if the automatic connection is to be made rather than just blindly incurring charges, though this choice could be overridden by a user setting. Therefore, in step 466 this determination is made whether this charge is the case. If so, control proceeds to step 468 to determine an estimated cost for the particular synchronization attempt. This would be based knowing the particular communication channel and a database of previous attempts. Control proceeds to step 470 to provide a prompt to the user to request approval to synchronize. If the user indicates no approval as determined in step 472, control returns to step 458 to continue trying to find a channel to use for synchronizing. If the transfer is approved in step 472 or there is no charge in step 466, control proceeds to step 474 where the host computer is accessed. It is understood that the host computer can be a standalone unit in which case a modem is directly dialed, or wireless interface is accessed or it could be a network computer in which case the handheld computer H also passes certain password and sign-on information as necessary. In this case for remote operation it is advisable to have two levels of password security, one to allow access to only the shared files or common files between the user designated location and the handheld computer H and a second level of password to allow greater access to the system. In any case it is considered desirable to have the handheld computer H include its serial number as an initial password or qualifier, with the host computer allowing synchronization access to only registered or previously stored serial numbers. Additionally, there could be multiple host computers, such as the user's computer and the user's secretary's computer. This would be appropriate where a second party keeps track of certain information such as calendaring or scheduling, with other information residing on the user's computer. In that case different sets of files and information to be synchronized must be kept for each host computer. Selection of which particular host computer is accessed could be a user selectable option or could be a query to the user with each synchronization attempt. It is understood that the host computer must be running, or be started by the communication attempt, and companion answering software executing for a successful access.

Control proceeds to step 476 to determine if the access to the host was successful. If not, control proceeds to step 458 to continue searching for a channel. If successful, control proceeds to step 478 where the calendar synchronization sequence 550 (FIG. 10) is executed. After the calendar is synchronized, control proceeds to step 480 where the contact list or telephone number synchronization sequence 550 is executed. Control then proceeds to step 482 where the expense account synchronization program 600 (FIG. 11) is executed and then to step 484 to synchronize any files in the user's designated file/directory or notepad list. This synchronization process 630 (FIG. 12) is then executed.

Control then proceeds to step 486 to allow the user to sign on to a network, either local or wide area, mail system accessed by the host computer to allow the user to update and check any mail messages. This mode is preferably an interactive mode so that the user can actually perform E-mail operations. Preferably the mail program sets flags for any new mail messages to allow them to be reviewed first, with general E-mail operations occurring after the review, if desired. Control then proceeds to step 488 to determine if the user wishes to enter remote operation or this is only a synchronization request. If it has been indicated that this is a remote operation request, control proceeds to step 490 where remote operation is entered. Remote operation allows the user to obtain files from the host system not previously stored in the handheld computer H and allows access to the full resources available on the host computer. Thus, while a tradeoff is made by the user about which files to include in the handheld computer H, if a missing file is needed, it can be readily obtained. From step 490 or if remote operation is not desired in step 488, control proceeds to step 492 where the communications channel is closed either by hanging up or by ending as appropriate Control then proceeds to step 494 which is a return without an error flag to the calling sequence. The return indicates that synchronization in this particular case has been completed and all files are now coherent.

Figure 10:
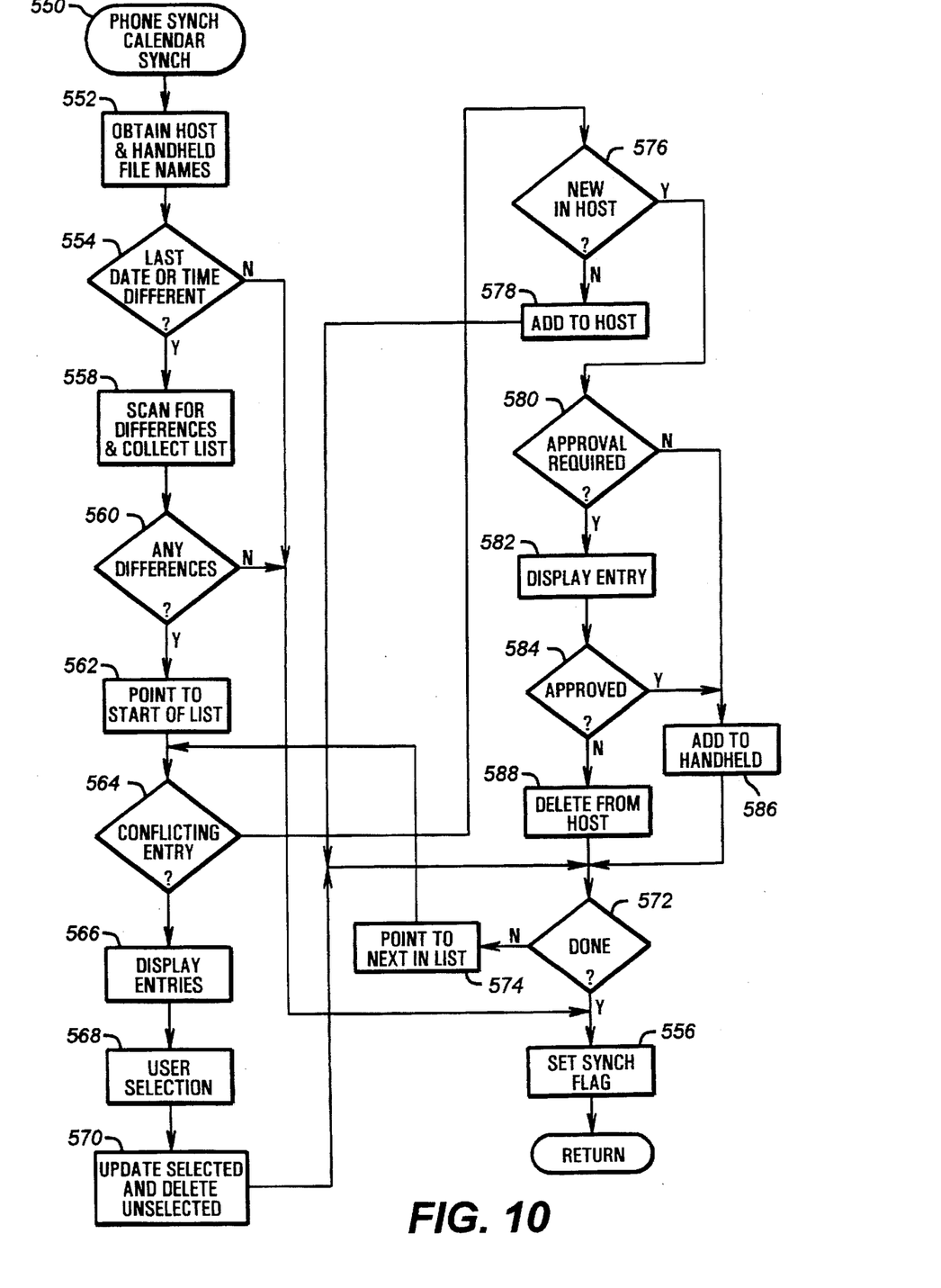

The calendar and contact number synchronization sequences are similar and are shown in FIG. 10. The sequences 550 commence at step 552, where the appropriate host file and handheld file names are obtained to allow comparison. Control proceeds to step 554 to determine if the last dates or times of the two files are different. Alternatively, the file lengths could be compared. If not, control proceeds to step 556. If the times or dates are different in step 554, control proceeds to step 558 to scan the two files for any differences and to collect a list of these differences. Control proceeds to step 560 to determine if there were any differences. If not, control proceeds to step 556. If so, control proceeds to step 560 where a pointer is placed at the beginning of a list. Control proceeds to step 564 to determine if the first entry is a conflicting entry. If so, control proceeds to step 566 to display the conflict. The user in step 568 then selects whether the handheld or the host entry is to be utilized. Control proceeds to step 570 to update to the selected entry and delete the unselected entry. Control proceeds to step 572 to see if this was the last entry in the list. If so, control proceeds to step 556. If not, the pointer for the list is incremented in step 574 and control returns to step 564.

If the entry was not a conflicting entry, control proceeds to step 576 to determine if the entry was new in the host. If not, it is assumed to be new in the handheld computer H and control proceeds to step 578 where it is automatically added to the calendar or telephone number list in the host computer. This is assumed because any entry by the user is assumed to have precedence. Control then proceeds to step 572.

If the entry was new to the host as determined in step 576, control proceeds to step 580 to determine if approval is required before storage on the handheld computer H. If so, the particular entry that might be added is displayed in step 582 for user approval. Control proceeds to step 584 to determine if it was approved. If approved or if no approval is required in step 580, control proceeds to step 586 where the new host computer entry is added to the handheld computer H. Control then proceeds to step 572. If the entry was not approved in step 584, control proceeds to step 588 where the entry is deleted from the host and control then proceeds to step 572.

In step 556 a synchronization flag for the calendar or telephone file is set so that synchronization status can be readily determined at a later date. Control then proceeds to step 590 which has a return to the calling sequence.

Alternatively, instead of comparing the last dates and times of the two files to determine if they are different it may be appropriate to have the routines set and clear the synchronization flag so that whenever an entry is made to the particular file, either on the host or on the handheld computer H, then the appropriate synchronization flag is cleared and step 554 can then just determine if a synchronization flag has cleared. This would resolve the need to require the clock to keep with a base time and a local time.

Figure 11:
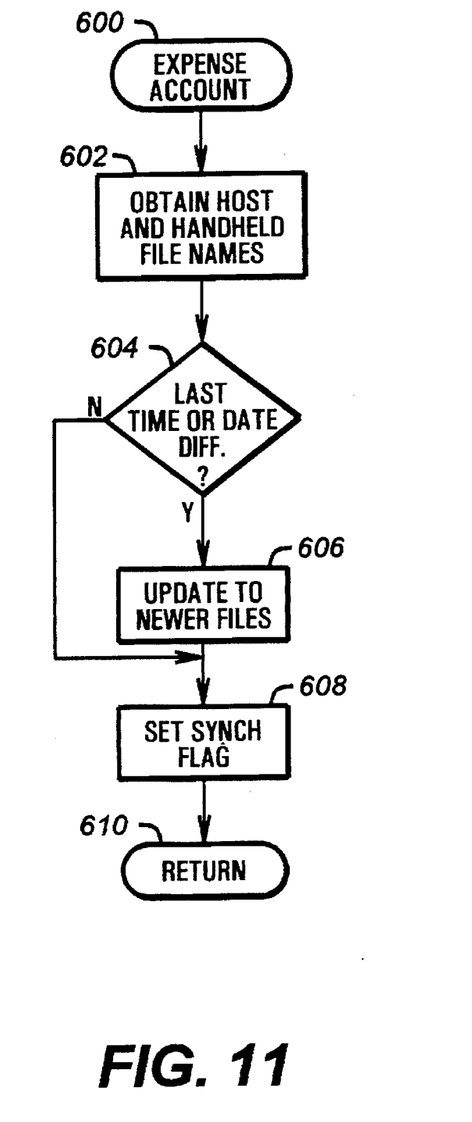

Expense account updating is much simplified over calendar or telephone number synchronization. The expense synchronization sequence 600 commences at step 602 where the host and handheld file names are obtained. Control proceeds to step 604 to determine if the files have different dates or times. Alternatively, the synchronization flag can be checked as discussed above. If so, control proceeds to step 606 where the handheld file is transmitted to the host computer, assuming that entry will be done only at the handheld computer H as this where the expenses are being incurred. If the dates or times are not different in step 604 or after updating in step 606, control proceeds to step 608 where the synchronization flag is set and to step 610 for a return to the calling sequence.

Figure 12:
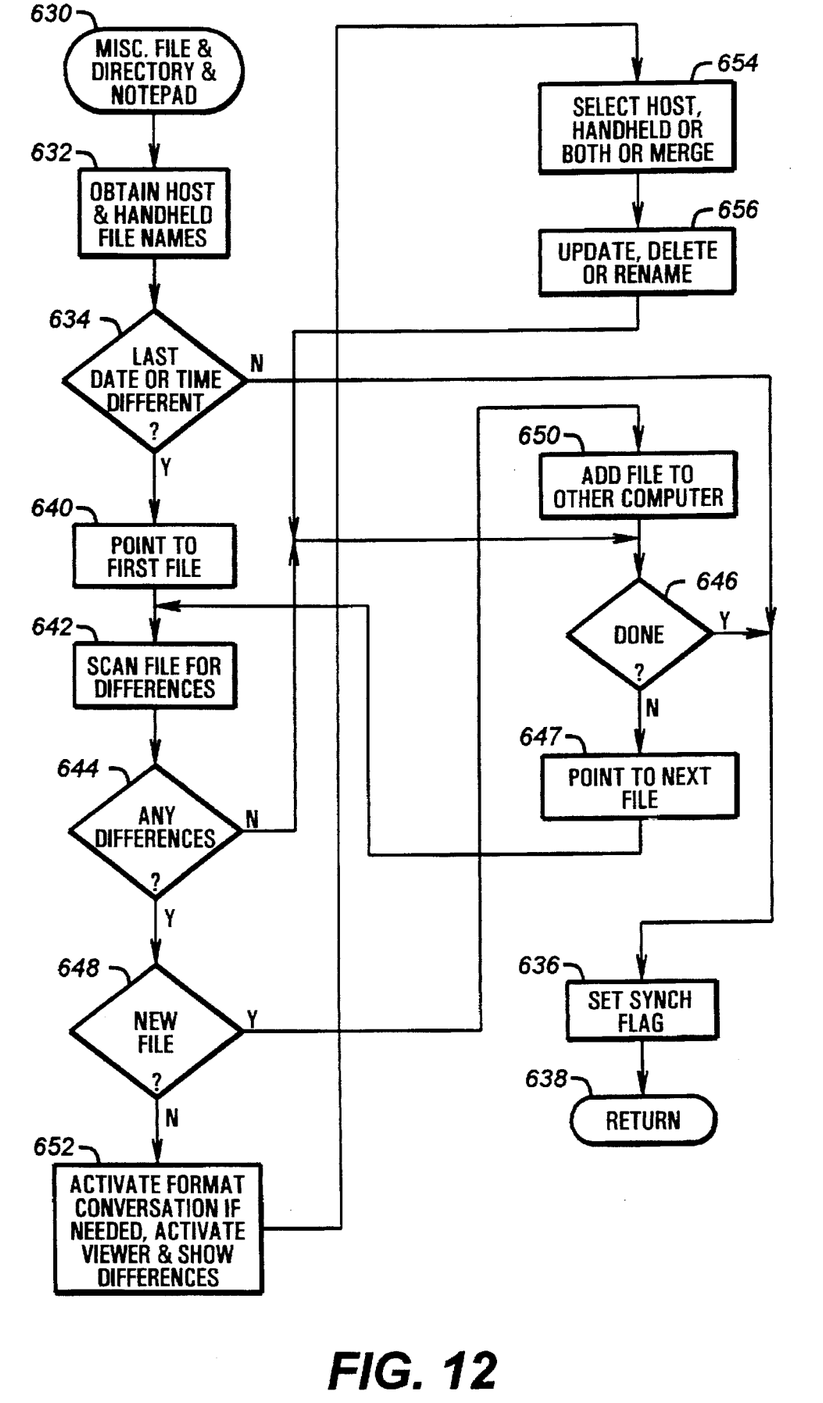

Miscellaneous file and directory synchronization such as that necessary for the notebook files, for word processors, for spreadsheets and so on is handled in yet another manner. This is shown in FIG. 12, with the synchronization sequence 630 beginning at step 632, where the various host and handheld file names, types and directories are developed. Control proceeds to step 634 to determine if the dates or times are different for the particular files. If not, control proceeds to step 636 where a synchronization flag is set to indicate that this synchronization step has been performed and then to step 638 which returns to the calling sequence. If the dates or times are different, control proceeds to step 640, where the first different file is indicated. Control proceeds to step 642 where the two files are scanned to determine if there are any differences. Control proceeds to step 644 to determine if any differences were found. If not, control proceeds to step 646. If so, control proceeds to step 648 to determine if the entire file is new. If so, control proceeds to step 650, where the file is added to the appropriate end, either the host computer or the handheld computer H. If the whole file was not new but the file was simply edited, control proceeds to step 652, where the viewer module 226 is activated and the particular differences are highlighted and shown to the user so that he can make a proper decision. If the files being compared are separate ink or graphic annotation files for overlaying a basic text or image file, the inking differences are shown over the underlying basic file. In step 654, the user selects whether to keep the handheld or host or both files or merge the files. In this manner the more recent or more accurate of the two can be obtained or if a conclusion cannot be reached both copies can be saved with different names or the files can be combined. The combination or merger is appropriate to both text files and for inking files. After the selection is done, control proceeds to step 656 where updating, deleting and renaming as appropriate is performed. Control then proceeds to step 646.

In step 646 a determination is made whether this is the last file. If not, control proceeds to step 647 to point to the next file and to step 642 to perform the steps on the next file. If all of the files have been checked, control proceeds to step 636.

Thus the handheld computer H can automatically synchronize files and data with a host computer when remotely located and continuously synchronizes common files when directly connected to the host computer C by a cradle interface 49. This automatic synchronization greatly improves the usefulness of the handheld computer H as a portable device.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A portable computer for communication with a host computer, both the portable and host computers having a plurality of files including at least one common file, each computer having an independent copy of the common file, each computer capable of independently modifying its copy of the common file, the portable computer comprising:

means for automatically establishing a communications link with the host computer;

means for comparing the copies of the common file in the host computer and the portable computer when said communications link is established; and means for resolving any differences in the copies and for storing identical copies of the resolved common file in the host computer and the portable computer, wherein said means for automatically establishing a communications link includes a plurality of communication channels usable by the portable computer and means for scanning said plurality of communication channels to establish said communications link and wherein said means for automatically establishing a communications link further includes means for receiving approval from a user to establish said communications link before incurring a charge if said communications channel to be used includes a charge.

2. The portable computer of claim 1, wherein said means for automatically establishing a communications link establishes said communications link as part of the turn on process of the handheld computer.

3. The portable computer of claim 2, wherein said means for automatically establishing a communications link further attempts to establish said link at periodic intervals.

4. The portable computer of claim 1, wherein said means for resolving the differences includes means for displaying both copies of the common file to a user to allow user selection of which copy to use as a master copy.

5. The portable computer of claim 4, wherein said means for displaying both copies highlights the differences between the copies of the common file.

6. The portable computer of claim 1, wherein the common file includes appointment information and wherein said means for resolving the differences includes means for displaying conflicting entries to a user for user selection of which entry to retain.

7. The portable computer of claim 6, wherein said means for resolving any differences further includes means for adding nonconflicting entries to the other computer without individual user approval.

8. A method for synchronizing a common file, an independent copy of the common file being present in both a portable computer and a host computer, each computer capable of independently modifying its copy of the common file, the method comprising the steps of:

automatically establishing a communications link from the portable computer to the host computer;

comparing the copies of the common file in the host computer and the portable computer when said communications link is established; and resolving any differences in the copies and storing identical copies of the resolved common file in the host computer and the portable computer, wherein said step of automatically establishing a communications link utilizes a plurality of communication channels usable by the portable computer and includes the step of scanning said plurality of communication channels to establish said communications link and wherein said step of automatically establishing a communications link further includes receiving approval from a user to establish said communications link before incurring a charge if said communications channel to be used includes a charge.

9. The method of claim 8, wherein said step of automatically establishing a communications link establishes said communications link as part of the turn on process of the portable computer.

10. The method of claim 9, wherein said step of automatically establishing a communications link further attempts to establish said link at periodic intervals.

11. The method of claim 8, wherein said step of resolving the differences includes displaying both copies of the common file to a user to allow user selection of which copy to use as a master copy.

12. The method of claim 11, wherein said step of resolving the differences includes highlighting the differences between the copies of the common file when displaying both copies.

13. The method of claim 8, wherein the common file includes appointment information and wherein said step of resolving the differences includes displaying conflicting entries to a user for user selection of which entry to retain.

14. The method of claim 13, wherein said step of resolving the differences further includes the step of adding nonconflicting entries to the other computer without individual user approval.

* * * * *